(12) United States Patent
Grassi et al.

(10) Patent No.: US 8,303,890 B2
(45) Date of Patent: Nov. 6, 2012

(54) INTEGRATED QUIESCENT PROCESSING OF MELTS

(75) Inventors: John R. Grassi, Peachtree City, GA (US); John Campbell, Ledbury (GB); Christopher Shaw, Kirkbymoorside (GB)

(73) Assignee: Alotech Ltd. LLC, Brooklyn, OH (US)

( * ) Notice: Subject to any disclaimer, the term of this patent is extended or adjusted under 35 U.S.C. 154(b) by 327 days.

(21) Appl. No.: 12/578,195

(22) Filed: Oct. 13, 2009

(65) Prior Publication Data
US 2010/0116453 A1 May 13, 2010

Related U.S. Application Data

(63) Continuation-in-part of application No. 11/710,452, filed on Feb. 23, 2007, now abandoned.

(51) Int. Cl.
*C22B 7/00* (2006.01)
(52) U.S. Cl. .................. 266/242; 266/236; 266/239
(58) Field of Classification Search .......... 266/236, 266/242, 200, 239, 208
See application file for complete search history.

(56) References Cited

U.S. PATENT DOCUMENTS

| | | | |
|---|---|---|---|
| 2,068,924 A | 1/1937 | Mulholland | |
| 3,809,379 A | 5/1974 | Carbonnel et al. | |
| 3,890,139 A | 6/1975 | Suzuki et al. | |
| 4,002,468 A | 1/1977 | Stauffer | |
| 4,741,514 A | 5/1988 | Bleickert | |
| 4,850,577 A | 7/1989 | Yamaoka | |
| 4,881,670 A | 11/1989 | Yamaoka et al. | |
| 4,967,827 A | 11/1990 | Campbell | |
| 4,974,817 A | 12/1990 | Nakashima | |
| 4,990,059 A | 2/1991 | James | |
| 5,009,260 A | 4/1991 | Cleary et al. | |
| 5,035,277 A | 7/1991 | Kubisch | |
| 5,597,032 A | 1/1997 | Merrien | |
| 5,662,859 A | 9/1997 | Noda | |
| 5,725,043 A | 3/1998 | Schaefer et al. | |
| 5,846,480 A * | 12/1998 | Cibaldi | 266/158 |
| 6,004,368 A | 12/1999 | Chandley et al. | |
| 6,103,182 A | 8/2000 | Campbell | |
| 6,311,758 B1 | 11/2001 | Sakabe et al. | |

FOREIGN PATENT DOCUMENTS

DE 486 525 11/1929
(Continued)

OTHER PUBLICATIONS

International Search Report of PCT/US2008/002279 dated Aug. 11, 2008.
(Continued)

*Primary Examiner* — Scott Kastler
(74) *Attorney, Agent, or Firm* — Fay Sharpe LLP

(57) ABSTRACT

A quiescent melt handling system includes a melting furnace and a holding furnace communicating with the melting furnace for holding a molten metal melt. The holding furnace has a relatively large surface area and a relatively shallow depth, having a width to depth ratio in the range of 4-100 to 1. Also provided is structure in the holding furnace for separating inclusions from the melt in the holding furnace. A mold communicates with the holding furnace. A counter gravity casting system, which might comprise a vacuum assisted casting system, draws the melt into the mold.

11 Claims, 6 Drawing Sheets

FOREIGN PATENT DOCUMENTS

| | | |
|---|---|---|
| EP | 0 095 645 | 12/1983 |
| EP | 0 291 580 | 11/1988 |
| EP | 0 300 411 | 1/1989 |
| EP | 0 738 552 | 10/1996 |
| EP | 1 752 726 | 2/2007 |
| FR | 2 285 584 | 4/1976 |

OTHER PUBLICATIONS

Written Opinion of the International Searching Authority of PCT/US2008/002279 dated Aug. 11, 2008.

* cited by examiner

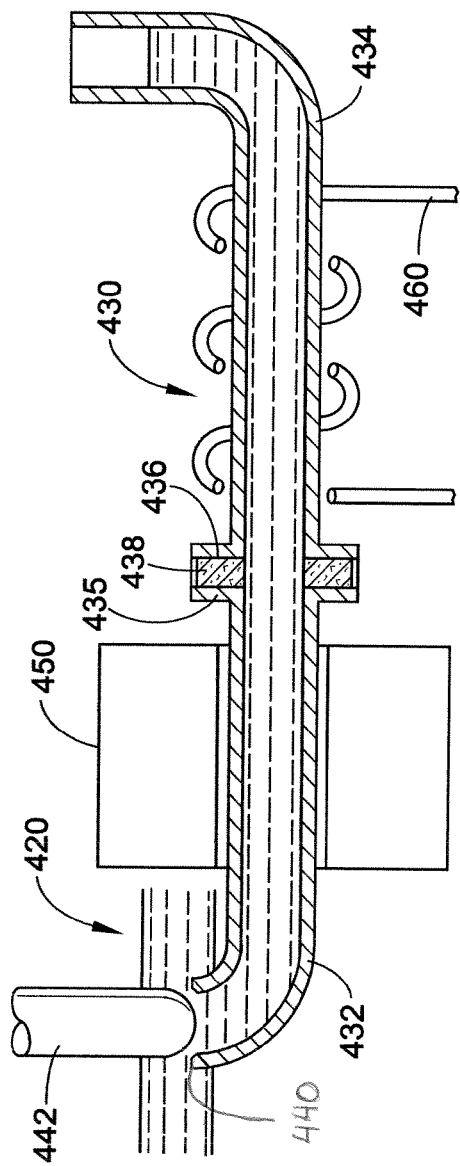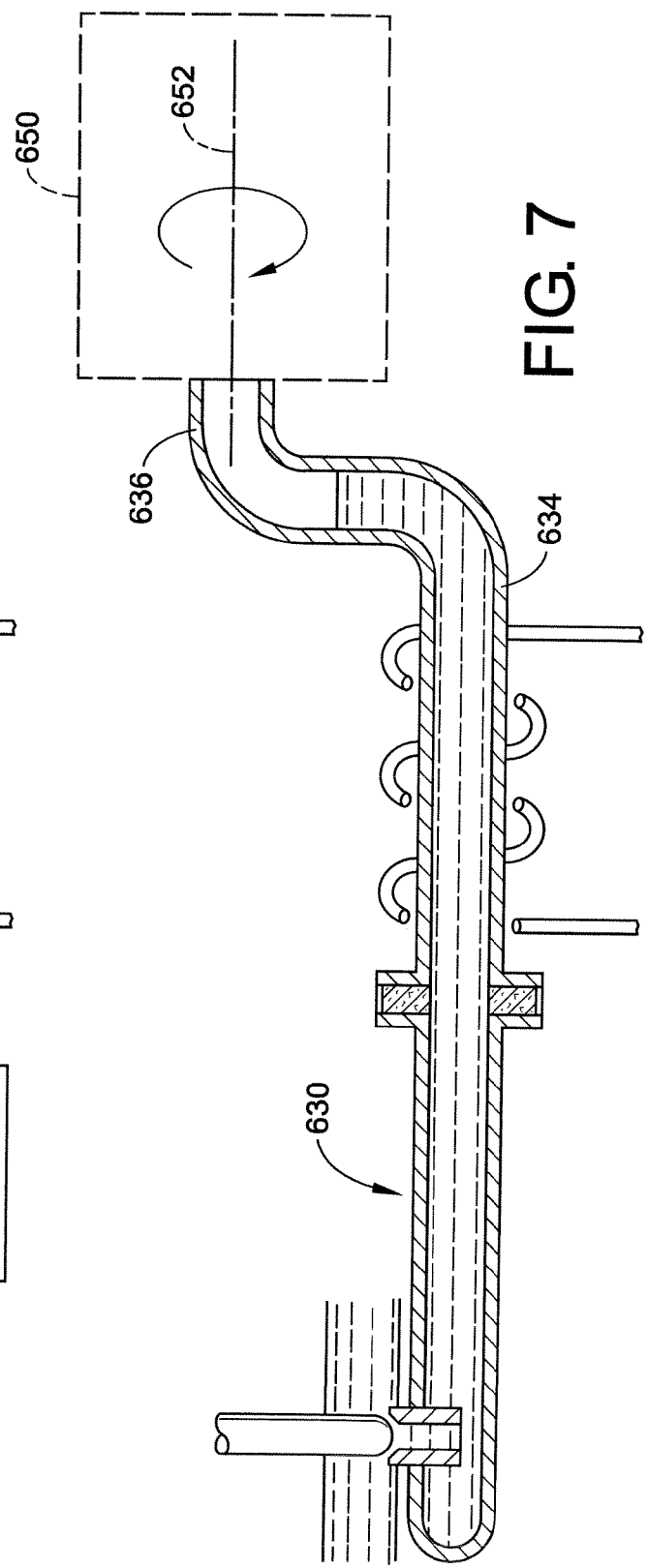

INTEGRATED QUIESCENT PROCESSING OF MELTS

This application is the continuation-in-part of U.S. application Ser. No. 11/710,452 which was filed on Feb. 23, 2007 and now stands abandoned.

This disclosure relates to the melting, holding, degassing and casting of liquid metals, particularly light metals such as aluminum and magnesium, by a totally quiescent means. This encourages the detrainment of non-metallic inclusions from the melt, and avoids the re-entrainment of surface oxides into the metal during degassing and the transfer to the point of casting and during the casting process itself.

BACKGROUND OF THE DISCLOSURE

Conventional methods of transferring and casting liquid metals by pouring effectively in free fall under gravity practically always introduce defects into the liquid because of the turbulent folding over of the liquid surface. Such transfer folds the surface oxide into the bulk of the liquid metal. These folded films possess no bonding between the opposed oxide surfaces, and so act as cracks in the liquid. The freezing-in of the doubled-over films (known as 'bifilms') into castings results in poor and erratic mechanical properties and low fatigue resistance of the cast component. The bifilms are frozen into products solidified from the melt. They lower both the strength and ductility of such products.

Once introduced, bifilms are not easily eliminated from liquid metals, particularly oxide bifilms in liquid aluminum (Al) and its alloys. The reason for this is that the bifilm initially ravels into a compact ball, allowing it to pass through most filters. Later, in the casting, it can unravel, becoming a serious crack-like defect that reduces the properties of the casting. Bifilms in Al and its alloys will also not sink or float in any reasonable time. The reason for this is that the aluminum oxide is slightly denser than liquid Al and so should sink. However, when folded in by surface turbulence (for instance during a pouring action) the air entrained between the folded-over film (giving it its name 'bifilm' to denote its doubled-over nature) causes it to float. This nearly neutral buoyancy together with its film-like aspect ratio confers an extremely low Stokes velocity. Thus any slight convection in the melt will cause the suspended oxide defects to circulate for hours or days. The problem of bifilms is especially serious in light metals, such as magnesium and aluminum and in alloys which contain these elements.

It is beginning to be widely understood therefore that quiescent transfers of the melt, avoiding the "bucket technology" approach that is so common in the industry, are necessary for good results. However, the quest for totally quiescent melting, and totally quiescent transfers to effect casting, has not been easy, and has thus far been elusive. First, the melt needs to be obtained. One way of obtaining the melt is via a dry hearth furnace. In the known dry hearth melter designs, the dry hearth furnace empties into an intermediate holding bath where additional burners heat the metal up to casting temperature. Thereafter, such systems pour the metal or hand ladle or robot ladle the melt from the intermediate reheater of the dry hearth furnace into the holder or other onward transfer systems.

Prior to casting, the cleaning of the metal is usually nowadays carried out by the production of thousands or millions of minute bubbles of an inert gas introduced beneath the surface of the melt. This can be achieved via porous plugs inserted into the walls or base of the holding vessel, or by rotary degassing, in which an immersed rotor is caused to spin in the liquid, releasing clouds of minute bubbles. Such techniques use inert gas to flush out dissolved hydrogen and usually operate with impressive efficiency. Furthermore, it is thought that the bubbles attach to suspended oxides and carry them to the surface of the melt, from where they can be skimmed off. Unfortunately, however, this technique also re-introduces millions of minute double oxide films because the inert gas cannot be truly inert; it will always contain sufficient contaminating gases to create a thin oxide layer on the surface of every bubble. In addition, of course, the bursting of the bubbles at the surface of the melt necessarily reveals the interior of the bubble to the air, so increasing the possibilities for the re-introduction of oxide defects.

Thus the so-called cleaning process is one in which the few large double oxides are probably replaced by millions of small double oxides. For this reason, the total cleaning action is less than optimum. Even worse, it is not uncommon for rotary degassers to operate in such a way that a vortex is formed around the rotor shaft which carries air down into the melt, re-introducing oxides as fast as they can be removed. In addition to these problems, if the rotor assembly is not completely dry (the refractories are likely to have absorbed up to ten percent water vapor over a weekend for instance) the first several minutes of operation of the rotary degasser will cause an increase in the gas content of the melt. Thus the melt will get worse before it gets better. For those systems working on an automatically-controlled (i.e. rather short) degassing time, the final result is likely to be a melt with increased rather than decreased hydrogen content. Also, of course, the general stirring actions in the liquid that any kind of bubble degassing introduces to the melt, eliminates any chance of inclusions separating via a sink or float process.

Moving on to the problems of casting, the transferring of the molten metal into the mold cavity, there has been considerable interest in the use of pneumatic dosing systems. However, the embodiment of such systems has so far involved the use of furnaces that are large pressurized vessels. These are not easily controlled because of their large volume of compressible gas, and large amount of heavy liquid that needs to be accelerated into the mold cavity. Even more seriously, such units have to be filled with liquid metal, and the filling is usually carried out by pouring under gravity, often from a considerable height, thus introducing the very defects that the process seeks to avoid. There is, thus, good reason to avoid surface turbulence at every stage of melting and casting of the molten metal if this is possible.

Only in the last few years has it become clear how to handle liquid aluminum alloys and other liquid metals. The fundamental issue involved is the problem of entrainment. This problem has rarely been identified as a source of concern for the liquid metal industries, especially in the shaped casting industry, where pouring of metals is endemic to the industry. Of course, the pouring of a molten metal or melt is the worst type of handling, causing maximum entrainment.

Furthermore, having suffered some degree of entrainment, it has not been clear what to do about it. The settling of entrained oxides has been known to a few foundry operators, such as is discussed in U.S. Pat. No. 4,967,827 dated Nov. 6, 1990. The '827 patent discloses the Cosworth Casting Process, in which the melt is made by an unspecified melting process, held for some time in a large holding furnace of conventional design, and casting is carried out by the use of an electromagnetic pump. However, the holding furnace is of such a shape, with its large depth, that the cooler walls encourage downward flow of cooler metal, setting up a convective stirring regime that prevents the efficient settling of inclusions in suspension. No one appreciated that the settling process was woefully inefficient, because of convection, in the rather deep furnaces employed, such as is illustrated in the '827 patent. The problem with such furnaces is that the sides of such a furnace are always at a different temperature than are the tops and bottoms of the furnace.

Moreover, even if one has successfully detrained or removed defects from the liquid metal or melt, few have connected such settling tanks directly to a counter gravity filling system, such as is illustrated in the '827 patent. This, at least, avoids the reintroduction of freshly entrained defects, such as via pouring or other turbulence. Even here, however, the holding furnace was connected to an extremely expensive electromagnetic pump. The existing electro-magnetic pumps are also somewhat counter-productive because of the huge power dissipation in the working volume of the pumps, resulting in very high redundant forces which cause intense high velocity stirring; only a minute fraction of the electrical power is used in the useful propulsion and pressurization of the metal. At the present time, despite the useful and praiseworthy historical advance that this system represents, neither the melting, nor holding, nor casting technology is in accordance with the recommendations of the present disclosure. The current disclosure seeks to improve greatly on this previous top world-class casting process. It will be understood, of course, that the principles disclosed herein apply not only to metals such as aluminum and magnesium but apply equally well to a wide range of metals and alloys.

Other previous attempts at improved melting and casting processes can be mentioned that also generally fall short of the advantages noted in the current disclosure. It is noteworthy that the geometry of the holding vessels is not described in any detail in the prior art documents. Thus the central issue of quiescent holding to the degree that suppression of convection is achieved, encouraging inclusions of nearly neutral buoyancy to settle under gravity, is not appreciated in the prior art.

Accordingly, it has been considered desirable to develop a new and improved quiescent transfer process for molten metals which would overcome the foregoing difficulties and others while producing better and more advantageous results. It would also be beneficial to employ a simple and low cost system for a filling operation of a mold.

BRIEF SUMMARY OF THE DISCLOSURE

According to one aspect of the present disclosure, a quiescent melt handling system is provided. More particularly, in accordance with this aspect of the disclosure, the quiescent melt handling system comprises a melting furnace and a holding furnace communicating with the melting furnace. The holding furnace contains a molten metal, wherein the holding furnace comprises a relatively large surface area and a relatively shallow depth having a width to depth ratio in the range of 4-100 to 1. A means for separating inclusions from the melt is provided in the holding furnace. A mold communicates with the holding furnace. A vacuum assisted casting system draws molten metal into the mold.

In accordance with another aspect of the present disclosure, there is provided a quiescent melt handling system. More particularly, in accordance with this aspect of the disclosure, the quiescent melt handling system comprises a melting furnace for producing a molten metal melt and a holding furnace communicating with the melting furnace for holding the molten metal melt. The holding furnace comprises a relatively large surface area and a relatively shallow depth, such that a width of the holding furnace in relation to a depth of the holding furnace has a ratio in the range of 4-100 to 1 in order to minimize convection in the melt in the holding furnace. A counter-gravity casting system is provided to urge the molten metal melt to flow from the holding furnace into a mold.

In accordance with another aspect of the present disclosure, a method of quiescent melt handling is provided. More particularly, in accordance with this aspect of the disclosure, the method comprises melting a metal in a melting furnace to produce a melt, and flowing the melt into a shallow holding furnace. A substantially unvarying horizontal level of melt is maintained in the melting furnace and the holding furnace. Oxide films in suspension in the melt in the holding furnace are allowed to settle out via gravity. The melt is then flowed from the holding furnace via a casting station to a mold.

BRIEF DESCRIPTION OF THE DRAWINGS

The disclosure may take physical form in certain parts and arrangements of parts, preferred embodiments of which will be described in detail in this specification and illustrated in the accompanying drawings in which:

FIG. 5 is an enlarged schematic side elevational view of a portion of a quiescent transfer casting furnace according to a fifth embodiment of the present disclosure;

DETAILED DESCRIPTION OF THE PREFERRED EMBODIMENTS

Figure 1:
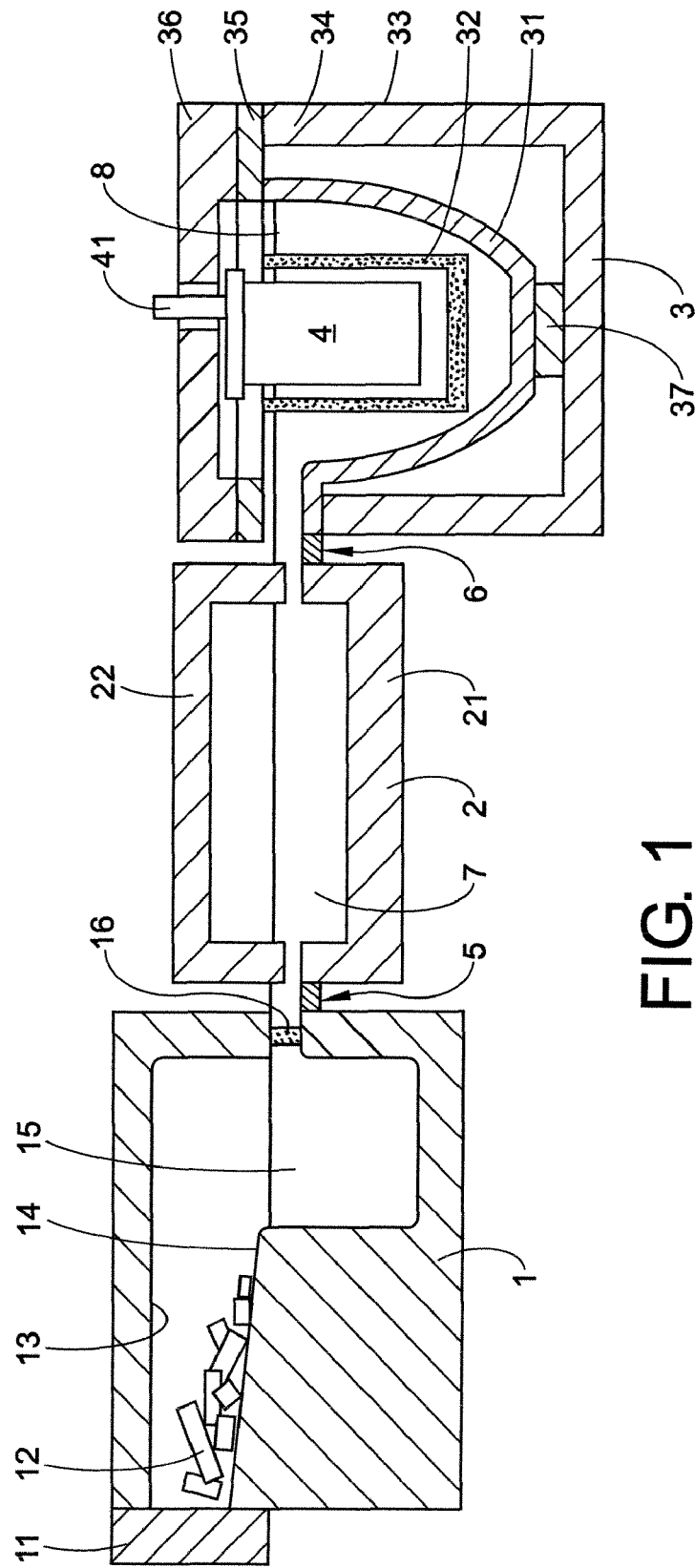
FIG. 1 is a schematic side elevational view in cross-section of a quiescent transfer casting furnace system according to a first embodiment of the present disclosure.

Referring now to the drawings wherein the showings are for purposes of illustrating preferred embodiments of the disclosure only and not for purposes of limiting same, FIG. 1 is an example of a 3-element interpretation of the current disclosure. A melting furnace, element 1, preferably of a dry hearth type, is connected to a second element, a holding furnace of shallow depth and relatively large surface area 2, preferably of a radiant roof type, that is in turn connected to the third element, constituting a pump well furnace 3. In the pump well furnace, can be sited a pneumatic pump 4 of the type described in U.S. Pat. No. 6,103,182 dated 15 Aug. 2000. The simple channel connections 5 and 6 between the three elements (which may or may not be three separate furnaces) are arranged to convey the liquid metal 7 at constant surface level 8.

Delivery of molten metal into the holder can be accomplished by a dry hearth type melting furnace. Such a furnace is conveniently fuel-fired, and attains a high melting efficiency by either (i) the use of twin recuperating burners so that charging can be carried out at floor level; or (ii) the furnace is a tower variety in which high thermal efficiency is achieved by conveying the spent gases from the melting burners up the stack, counter-current to the charge which descends as melting takes place.

The significance of the choice of the melting unit as a dry hearth furnace is that the oxide skins of the ingots or foundry returns (runners, risers and castings etc) are designed to be left on the dry hearth. Only the melted metal runs down the hearth and into the furnace well. The skins, dross, or even steel insert parts from mixed scrap, can be separated by raking off from the hearth at intervals via a side door. Thus only relatively clean metal is provided to the start of the melt supply. The dry hearth furnace has the further benefit that it provides liquid metal on demand, can operate continuously, and the rate of delivery can be adjusted by control of the burners. Moreover, a dry hearth furnace has practically no moving parts and requires relatively little attention or maintenance.

Such furnaces deliver a high quality metal because the main oxide skins on the charge material (and any iron inserts such as cylinder liners etc) remain on the sloping dry hearth, and can be removed at intervals as necessary via a side door. This benefit contrasts with induction and other crucible type furnaces, where the oxides on the surface of the charge materials and all remaining inserts are necessarily incorporated into the melt.

The melt from such furnaces is, however, at rather a low superheat. Thus an additional function of the holding furnace (2) is to bring the melt temperature up to a casting temperature, and stabilize the melt at this temperature. This is easily achieved because of the large surface area and small depth of the melt in the holding furnace.

The fact that the melt is at a low temperature for much of the area of the holding furnace ensures that degassing is carried out with maximum effectiveness, since degassing efficiency is higher at lower metal temperatures.

The rate of delivery of metal can be adjusted to maintain the melt level in the furnace between close limits by controlling the rate of burning of fuel by the burners. The rate can therefore be turned up or down at will. Thus the system is a 'just-in-time' or an 'on-tap' melt delivery system.

The dry hearth furnace may be of a conventional tower design requiring a lifting device, often a type of skip hoist design, to raise and load the charge materials into the top of the furnace. Alternatively, as shown for purposes of example only, the furnace may be of a horizontal design, employing twin regenerative burners, using air for combustion heated by the spent gases, to raise melting efficiency. Charging is then carried out conveniently at floor level by fork lift truck via a door 11, opened to admit the metal charge 12. The charge is then melted by heat from fuel burners or electrical elements (not shown) under a radiant roof 13. The melted metal runs down the sloping hearth 14 into the well 15 of the dry hearth furnace, or, possibly via the connecting channel 5, directly into the holding furnace.

The dry hearth furnace may have a well, forming a reservoir in which gentle mixing under a tranquil surface is encouraged to provide a smoothing of chemical changes as charges to the furnace are changed, or as the melt rate changes. The well region of the furnace allows a second burner or other heater to be sited to raise the temperature of the melt, since the metal drains from the dry hearth practically at its melting point. Usually at least 50 to 150 C superheat (the temperature above the melting point) would be required to make most castings. Thus most of the superheat will need to be made up by the second burner or other heater in the melting furnace (the final adjustments to temperature can, of course, be made later in the holding furnace, or even in the pump well itself).

The dry hearth furnace well and the holding furnace can be connected via a simple ceramic channel 5 (although other connections such as a ceramic tube can be envisaged to work equally well). Such connections necessarily require the normal attention to detail including good thermal insulation, and reasonable exclusion of air by suitable heated or insulated cover. Alternatively, of course, the furnaces may be effectively integrated to avoid any necessity for a separate link, as discussed hereafter.

The melt 15 may exit the melting furnace via a filter 16 which may be of any suitable type such as the ceramic foam or bonded particle types. Alternatively, if used at all, a filter may be placed in the entrance to the holding furnace 2.

The quiescent transfer of molten metal from the melting furnace to the holding furnace is achieved if the two units are in good hydrostatic communication and so have substantially identical liquid levels. In such a situation the melt travels with extreme gentleness from one furnace to the other.

The melt then enters the holding furnace, which is an important element of the disclosed melt handling concept. This furnace comprises a base part 21 that contains a shallow bath of liquid metal, and a roof 22 that contains the heating elements. The source of heating can be electrical resistance elements or tubular gas radiant elements and the mechanism of heat transfer to the melt is radiation, as is normal for a reverbatory type furnace.

The large area and shallow depth of the melt in this element acts beneficially in a number of ways:

i. the large area acts as a reservoir and buffer to smooth temporary imbalances between the melt supply and demand, maintaining a substantially constant level;

ii. sufficient area is provided to allow the casting temperature to be adjusted rapidly if necessary, when changing cast products, or when assisting recovery from power failures or other breakdown, and the shallow depth allows equilibration of temperature throughout the melt by conduction;

iii. inclusions are given the time to encourage separation by a sink or float process because the aspect ratio (width/depth) of the furnace effectively suppresses convective stirring driven mainly by the cooling from sidewalls since the effect of sidewalls is reduced to insignificance in this design of furnace. The shallow bath will discourage convection, since the Rayleigh number is greatly reduced by the small depth, correspondingly reducing the temperature difference available to drive any flow, and the relatively increased proximity of drag inducing constraint of the top and bottom surfaces of the melt. This is a great benefit because settling of bifilms can now occur quickly and efficiently over the relatively small settling distance without the bifilms being continuously stirred back into the bulk of the melt by convection that is naturally present in all other furnace types;

iv. hydrogen is allowed to equilibrate with the dry atmosphere above the melt that is constantly replenished while the hydrogen-contaminated spent gas is constantly removed. This degassing technique avoids the turbulent techniques commonly employed throughout the industry such as purging with bubbles from immersed lances or rotary degassing machines. Such turbulent degassing techniques can cause damage to the melt, leading to variable melt quality. The shallow depth of the furnace is calculated to allow the majority of hydrogen time to diffuse to the surface, and so escape into the atmosphere that is being continuously replenished with a hydrogen-free and moisture-free atmosphere.

v. the shallow bath is easy to clean, and contrasts with deep baths that sometimes are found to be impossible to clean because of oxide material which can remain out of sight for long periods and becomes fused to the furnace lining.

vi. the liquid metal inventory is unusually low for a high production casting system. Liquid metal inventories are often in the region of 10 to 50 tonnes of liquid metal, so that an alloy change can rarely if ever be contemplated. Liquid metal inventories according to the current disclosure are expected to be in the region of 0.5 tonnes making maintenance or alloy changes easier.

The reduced depth of the holding furnace means a reduced metallostatic pressure, and so a reduced tendency to the development of leaks via cracks in the refractory bath. The shallow depth furnace is easy to clean and can be readily emptied unlike deep furnaces which are difficult to clean and are a challenge to empty. Moreover, some accumulations of refractory fragments and dross at the bottoms of deep furnaces are sometimes immovable. That should not be a problem with the disclosed shallow depth holding furnace.

It is necessary for the holding furnace to operate at a substantially constant level of liquid metal. This is achieved by ensuring that the rate of supply to the unit and rate of delivery from it are, on average, sufficiently well matched so that the change of level on additions to or deliveries from the unit cause the surface level to change by only relatively few millimeters. That is easily achieved by monitoring the height of the melt in the holding furnace, and adjusting the rate of melting from the melting furnace accordingly. The task of maintaining the constant height is facilitated if the area of the melt in the holder compared to the volume changes is sufficiently large.

It is desirable that this furnace is electrically heated by elements in the roof (although fuel-firing inside heater tubes is of course possible). This has the benefit of creating a positive vertical temperature gradient in the liquid bath that will assist to stabilize the melt against convection. In addition, the provision of a dry atmosphere (free from the water vapor characterizing fuel-fired furnaces) allows the unit to take advantage of passive degassing as will be described below, so avoiding the necessity to disturb the melt using conventional bubble-inducing degassing systems.

Because such electrical heating elements (or gas-heated tubes) are limited in length, the width of most holding furnaces of this type are limited to perhaps one or, at the most, two meters. Thus if extra area is needed because of the proposed manufacture of castings of large volume, it will generally be necessary to increase the length of the furnace. One key feature of the holding furnace is the aspect ratio of the width (or length) of the bath compared to its depth.

For instance, many holding furnace baths have a width to depth ratio of approximately 1.0. Sometimes, the bath might be only half the depth compared to the width, i.e. a ratio of 2. Such ratios are the norm. However, the relatively long vertical sidewalls lose a significant amount of heat, causing them to be slightly cool. The melt in contact with the side walls therefore cools, becoming denser, and so setting up a flow downwards, turning at the base of the furnace, and meeting the opposing flow from the far walls, rises in the center. Thus the whole of the contents of the furnace are subject to this double torroidal circulation pattern. The result is that even without other disturbances, inclusions of near-neutral buoyancy, such as oxide films, are allowed no chance to settle.

This disclosure proposes that the holding furnace width to depth ratio should be in the range 4 to 40 times as wide as it is deep, or preferably 5 to 50 or more preferably 10 to 100. In other words, the holding furnace should be at least four times as wide as it is deep, or possibly up to one hundred times as wide as it is deep (It is assumed that in most cases the length of the furnace will exceed its width, otherwise, the ratio would logically apply to the furnace length). Also, a length to width ratio of the furnace can be in the range of 1-100, or more, to 1.

The reason for the small relative depth of the holding furnace is that the effect of the side walls is now very much reduced. Not only is the convection effect not accumulated over a large height, but the temperature difference between top and bottom of the melt is now much less, plus any residual circulation is confined to the vicinity of the side walls. Thus the main body of the melt remains static.

The static nature of the main body of liquid now allows inclusions, such as oxide films, to sink even though their Stokes velocity (their natural sedimentation speed) is extremely low. Naturally, the longer the melt is allowed to dwell in the holding furnace, the smaller the inclusion that will be encouraged to separate out. The dwell time is, of course, related to the weight of castings produced and the number cast per unit time. For instance considering a relatively large Al alloy automotive cylinder block casting weighing 25 kg, it is easily shown that a furnace with a bath only 1 m wide, 100 mm deep and 3 m long would experience an average forward movement of the melt by 100 mm per casting, leading to a drop in surface level of 3 mm per casting. A casting every minute would give a dwell time of only 30 minutes. This is rather minimal, and is easily extended by a wider or longer bath. Less advantageously, the depth of the bath might be increased to an extent limited by the allowed ratios for effective operation.

Because a casting of this weight might expect to be filled in approximately 30 seconds, during which time the melt travels on average 100 mm, the actual average velocity of the melt during the period of casting will be of the order of only 3 mm/s, after which the melt comes to a stop once more. Thus even the maximum velocity of the melt is extremely modest. Such gentle movements are not expected to result in any significant turbulence, even in this example where the holder is perhaps somewhat undersize for its task.

Interestingly, from these rough figures, the inventory of liquid metal in the proposed system can be seen to be quite small, making alloy changes, or cleaning out of the system, relatively easy and quick. For instance for a depth of 100 mm and width of 1 m, each meter length of the furnace holds 250 kg. Thus a 3 m long unit will hold only 750 kg. This value contrasts with conventional holders for processes such as Cosworth Process in which a holder for such a casting duty would be expected to have a dwell time of at least 4 hours and hold 10,000 to 20,000 kg, but whose considerable depth would provide convection currents to swamp most of the benefits of the 4 hour dwell period.

In this disclosure, the degassing of the melt is achieved without disturbance of the liquid metal. The limited depth of the melt and its large area ensures that gas can diffuse out of the metal within the dwell time provided the atmosphere above the melt is maintained free from hydrogen, or sources of hydrogen such as water vapor or hydrocarbon gases. Thus dry nitrogen, or possibly even dry air, can be introduced above the melt. The volume of air or other gas present in the holding furnace above the melt is the same as in conventional holding furnaces of a given size.

The dry gas can be introduced near the exit from the furnace. The dry atmosphere therefore would travel beneficially in a counter-current direction to the flow of the liquid metal, and would be allowed to exit via the numerous natural leaks at the far end of the furnace. (Even so, of course, the additional natural leaks from the sides of the furnace will reduce the overall efficiency somewhat, but the effect is insignificant provided the lid is sitting down on the walls of the body of the furnace with a reasonable sealing face; the joint possibly additionally sealed with lengths of refractory blanket or rope. Similarly, the holes for the heating elements will also benefit from sealing in a 'rough and ready' manner with refractory wool or similar sealing material.)

The counter-current system is advantageous because the gas which enters at the end of the furnace where the melt is about to exit is the purest. Thus, despite leakage and contamination of the gas, as it flows toward the melt entrance in the holding furnace, the melt exiting the holding furnace is expected to be excellent.

The rate of flow of the gas in the holding furnace varies with the size of the holding furnace. For example, the rate of gas flow can be between about 2 to 6 liters per minute for a furnace which is 1 m wide 3 m long and 0.5 m high on the inside, above the melt.

Metal delivery from the holding furnace can be envisioned to occur in a number of ways in which disturbance is minimized to the main body of the melt. Several will be discussed.

The liquid metal in the holding furnace 2 can connect to a pump well in a separate casting unit via a launder channel 6. The pump well requires sufficient depth to accommodate the pump 4, plus any box type filter unit 32 that may surround or be inserted under the pump. Furthermore, it is an advantage to be able to provide additional heat input at this final element of the melt line. (This is because many such lines have pump wells which are part of the holding furnace, and have no separate heating facility. Thus, such wells often run too cool to allow the line to produce some difficult thin-walled products. Worse still, a failure of the refractory lining of this integrated holder/pump well furnace causing a leak of metal through to the steel casing of the furnace is then a death blow to such designs. The ensuing heat losses and fall in temperature of the metal in the pump well make almost all casting impossible, forcing a shutdown of the casting operation and a furnace re-line. The provision of a crucible furnace avoids the critical problem of low temperatures in the well with a low cost, simple, 'off-the-shelf' solution.)

These considerations for the pump well lead naturally to that particular design provided by a conventional crucible furnace. This is because the crucible has the required depth, and is surrounded by a heating source. The furnace usually includes a steel shell 33 with an insulating lining 34, which, in turn, contains a conventional silicon carbide or graphite based crucible 31.

The heating source surrounding the crucible (not shown) may be gas or electric. However, electrical resistance heating is normally to be preferred at this point in the line because waste gas ducts above the furnace are thereby avoided, and would otherwise complicate the sitting and operation of a casting station. Also, the permeability of the crucible to hydrogen means that the hydrogen in solution in the melt is probably kept lower by avoiding gas heating, with its accompanying load of water vapor as products of combustion. The crucible is held in place on its ceramic stool 37 with a cover assembly 35 and the whole covered by a lid 36 to retain heat and exclude moist air.

The pump itself 4 can be of the type described in U.S. Pat. No. 6,103,182 which is incorporated by reference hereinto in its entirety. This design of liquid metal pump has the capability of totally quiescent operation: it has an intake (not shown) for liquid metal beneath the surface of the liquid, transfers the liquid into the mold via a riser tube 41, and at a rate which can be precisely controlled by the application of gas pressure into the body of the pump. The small volumes of gas and liquid involved ensure that the precision of control is excellent.

Such pumps, whether pneumatic or electromagnetic, work with better repeatability if the melt level is constant, so that in this case such devices have optimum working conditions. In addition, the crucible furnace has its own source of heat, so that last minute adjustments to the casting temperature can be made. The generous (more than adequate) heating facility is far preferable to the usual geometry of a charge well as an extension to a normal electrically heated reverbatory furnace as outlined above.

Furthermore, the liquid can be held close to the open top of the riser tube 41. This is an important feature because the uncontrolled fall of the liquid down the riser tube on the completion of a casting is a feature of many less well controlled delivery systems. The fall of liquid acts to stir the metal inside the pressure vessel, thus stirring up once again inclusions that have taken time to settle to the bottom of the vessel. In addition, the fall of the liquid uncovers the inner surface of the riser tube, allowing the formation of a skin of oxide that can be incorporated into the melt during the next time the melt ascends the tube for the filling of the next mold. Thus, maintaining the riser tube continuously full of liquid metal not only saves a second or so off the filling time, but more importantly retains the excellent defect-free quality of the melt for each casting.

The connections between the elements of the melt line are made by simple known techniques, for instance by the use of proprietary preformed ceramic launder (channel) sections or ceramic tubes, as has been mentioned above. Good hydrostatic communication between the melting furnace, holding furnace, and casting station ensures substantially similar levels between the melter, holder and casting station, with the result that the transfer of the melt between the units occurs only with extreme gentleness, without turbulence. Some difference in level is expected to build up as filters become blocked, but the essential feature of the gentle transfer of the liquid is not thereby threatened, as will be evident to any who have worked with in-line filtration as part of a melt supply system.

As mentioned, a filter, possibly of a ceramic foam type, may be placed at the exit from the melting unit to keep back some of the larger inclusions. The filter will need to be replaced from time to time. Similarly, a box filter 32 of well-known form may be placed around the pump. Also, a ceramic foam filter may be sited underneath, to provide a final filtering operation.

Figure 2:
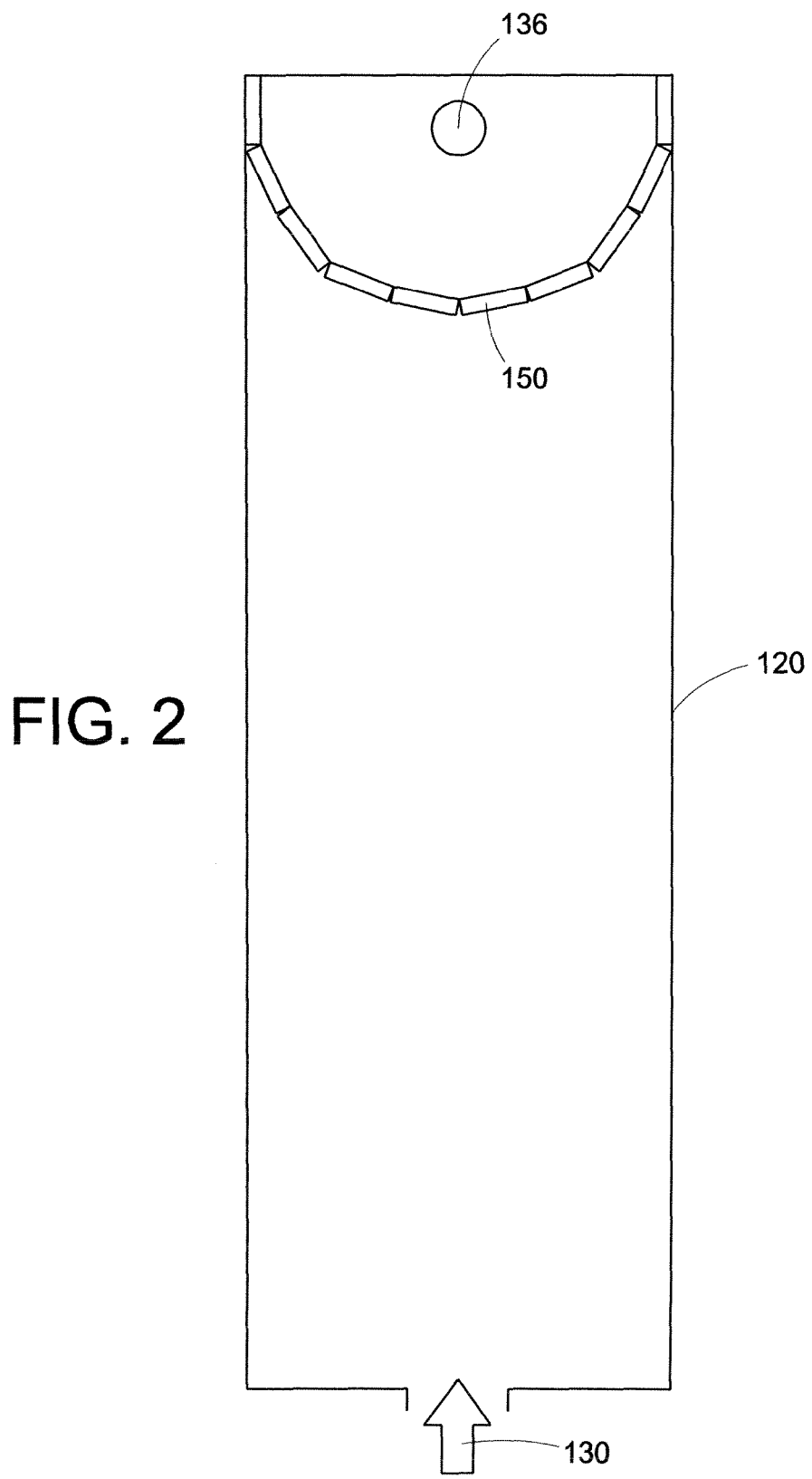
FIG. 2 is a schematic top plan view of a holding furnace according to a second embodiment of the present disclosure.

FIG. 2 shows a schematic plan view of a holding furnace 120 according to another embodiment of the present disclosure. In this embodiment, molten metal enters near the point marked with an arrow 130. This could be from a sloping dry hearth melting furnace, or the like. The holding furnace is shown with a site 136 for a drain port, as will be discussed below.

Filters 150, in the form of ceramic filter blocks, are shown placed in the bath. Their purpose is not primarily filtration. In operation the holding furnace 120 will gradually fill with settled-out debris of nearly neutral buoyancy. Thus, this effectively floatable material will travel with the melt rather than sitting firmly on the base of the furnace. It will build up to become a slurry of sundry debris. This porridge-like sludge will, if not restrained, travel as a body along the furnace. The purpose of the semi-circle of ceramic filter blocks 150 is to restrain this movement, holding the debris in place. Clearly, this role could easily be undertaken by a sintered ceramic particle box filter or other suitable device (or groups of such filters or devices) for holding back this slurry. In addition, of course, it may be found advantageous for the attainment of certain qualities of melt in certain alloys to introduce multiple such barriers.

Interestingly, it is not the intent that these barriers actively provide any significant filtering action. The main inclusion separation mechanism is sedimentation. However, as sedimentation proceeds, the debris itself will build up its own filtration efficiency as it accumulates in depth, and only become too efficient when the melt cannot pass through it sufficiently quickly to re-fill the exit region of the holding furnace above the drain port 136 prior to the next casting. At this point the rate of production will have to be slowed, forcing a cleaning operation for the holder or holding furnace. It is to be expected that complete cleaning out of the furnace will be required, perhaps, once a week, or once a month, or at some other regular interval depending on the quality of the incoming charge material.

Depending on the nature of the material charged to the melting unit and transferred into the holding furnace, the holder may benefit from additional barriers to the flow of debris. Thus, additional arrays of heavy filter blocks (not shown), or other barriers to hold back the general flow of settled-out debris, can be envisioned.

Figure 3:
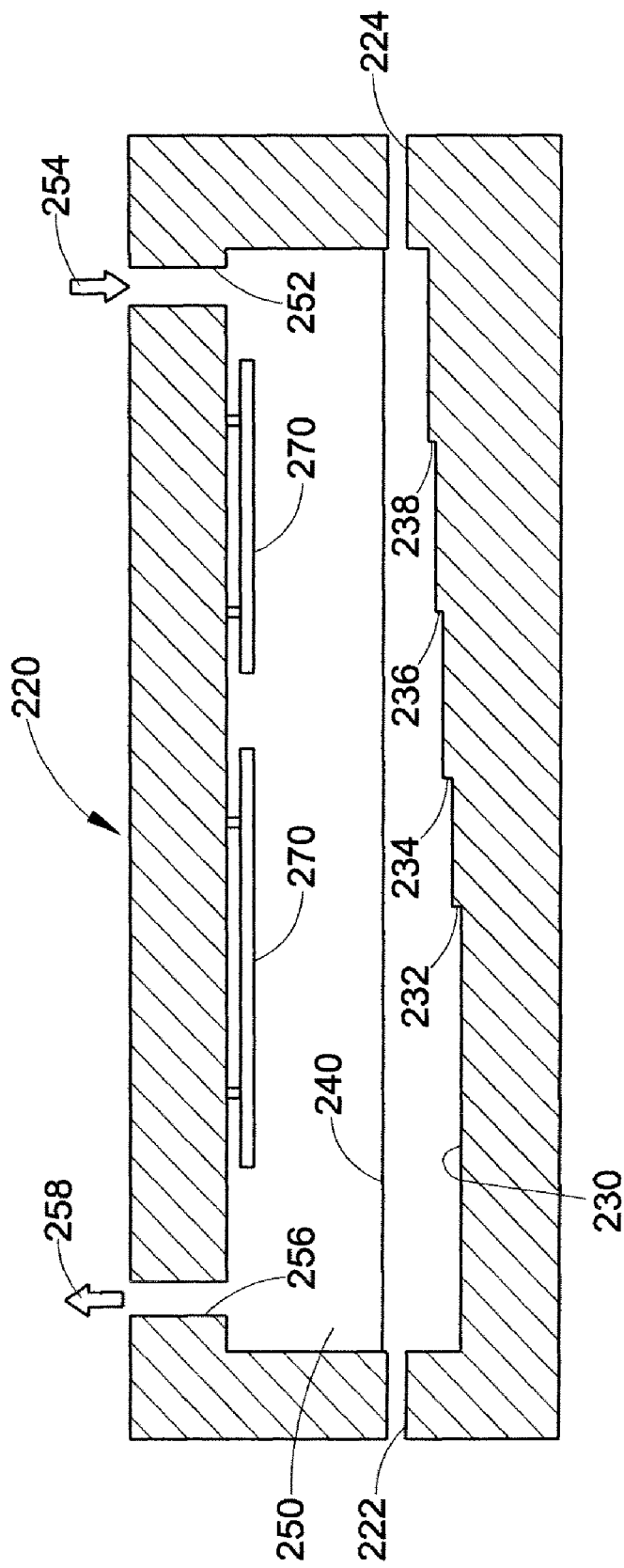
FIG. 3 is a schematic side elevational view in cross-section of a holding furnace according to a third embodiment of the present disclosure.

Alternatively, it can be envisioned that some barriers could be simple upward steps in the floor of the holder furnace, proceeding towards the exit. With reference now to FIG. 3, another holding furnace 220 according to the present disclosure is there illustrated. In this embodiment, the holding furnace is provided with an inlet opening 222 located at a first end thereof and an outlet opening 224 located at a second end thereof. The holding furnace includes a floor 230, including a set of upward steps 232-238 therein. The melt 240 is at a level to cover all the upward steps. The space in the holding furnace 220 above the melt is indicated by numeral 250. Each upward step, perhaps only 10 mm high, would help to restrain the general movement of the whole mass. The bifilms will have time to open in this quiescent environment, thus impinging and interlocking to form, macroscopically, a kind of fairly solid cake or gel. Thus relatively isolated points for pinning movement of the slurry or gel would tend to act on the whole mass because of its degree of integrity. Oxide films in general should behave in a like manner. It is believed that the up-steps would not interfere unduly with the raking out of the debris from the metal entrance end when the furnace will require its routine cleaning.

With continued reference to FIG. 3, the holding furnace 220 is provided with a gas inlet 252 through which a dry gas atmosphere flows into the holding furnace, as illustrated by arrow 254. The dry atmosphere or gas allows hydrogen in the melt to equilibrate with the dry atmosphere being replenished into the holding furnace via inlet 252. An outlet for the dry atmosphere is shown at outlet port 256 through which the gas, which has now picked up hydrogen, flows outwardly as shown by arrow 258. In this way, a counter current flow of the dry atmosphere takes place such that the cleanest gas, i.e., a gas which has not yet picked up any hydrogen, flows into the holding furnace via the gas inlet port 254 adjacent the liquid metal outlet port 224. This allows the melt exiting the holding furnace to be of the best quality. Gas which has picked up hydrogen from the melt flows away from the metal outlet port 224, in the holding furnace, and towards the gas outlet port 258 which is located adjacent to the metal inlet port 222 thereof. Also provided in the space 250 above the melt 240 are an array of heaters 270. As mentioned previously, the heaters can be radiant electric heaters of a conventional design. Of course, any type of dry heating means (i.e., any method of heating which does not involve burning a flame of combustible gas above the surface of the melt so that the products of combustion are exposed to the melt) would be acceptable.

A second example of the novel melting and casting system that is characterized by very little molten metal inventory in the whole system is described with reference to FIG. 4. As before, a melting furnace, element 310, preferably of a dry hearth type, is connected to a second element, namely, a holding furnace 320 of shallow depth and relatively large surface area, preferably of a radiant roof type. In this embodiment, an integrated melter-holder-caster system is disclosed. In other words, no channels are necessary to connect the melting furnace 310 to the holding furnace 320. However, there is provided a channel or transfer conduit 330 which connects the holding furnace 320 to a counter gravity casting unit or station 340. In this embodiment, the casting station, in turn, supports a sand mold 350.

An integrated system to melt, hold and cast metal products, in which each of the three components has been optimized to reduce entrained oxides to a minimum, is greatly beneficial. It has not been previously realized that all three elements were required to be present, and required to work effectively, otherwise successful elimination of defects in the melt would not be achieved. The dry hearth melter 310 eliminates the oxide skins from the exterior of the charge. The shallow bath holder 320 eliminates the dispersed oxides in suspension from the interior of the charge. Finally, the controlled counter gravity casting station 340 avoids reintroduction of new oxides during the final act of casting.

As with the melting furnace embodiment illustrated in FIG. 1, the melting furnace 310 includes a sloping hearth 312 so that molten metal runs down the sloping hearth and directly into the holding furnace 320. This reduces the total inventory of liquid metal in the system in order to facilitate alloy changes.

From the melting furnace 310, the melt directly enters the holding furnace 320. As in the previous embodiment, the holding furnace comprises a base part 322 and a roof 324 which contains heating elements. In one embodiment, the source of heating is a dry system, such as electrical resistance and the mechanism of heat transfer to the melt is radiation.

A dry hearth melting furnace is commonly provided with an additional bath in which the melt can be super heated to some degree. However, in this embodiment, this additional feature is not required. Rather, the melting furnace is integrated with the holding furnace so that the melt from the sloping hearth directly enters the holding furnace. A simple baffle (not illustrated) can be provided to keep separate the atmospheres of the melting furnace and the holding furnace. The entry of the melt into the holding furnace at a minimum temperature is one aspect of the embodiment illustrated in FIG. 4.

Figure 4:
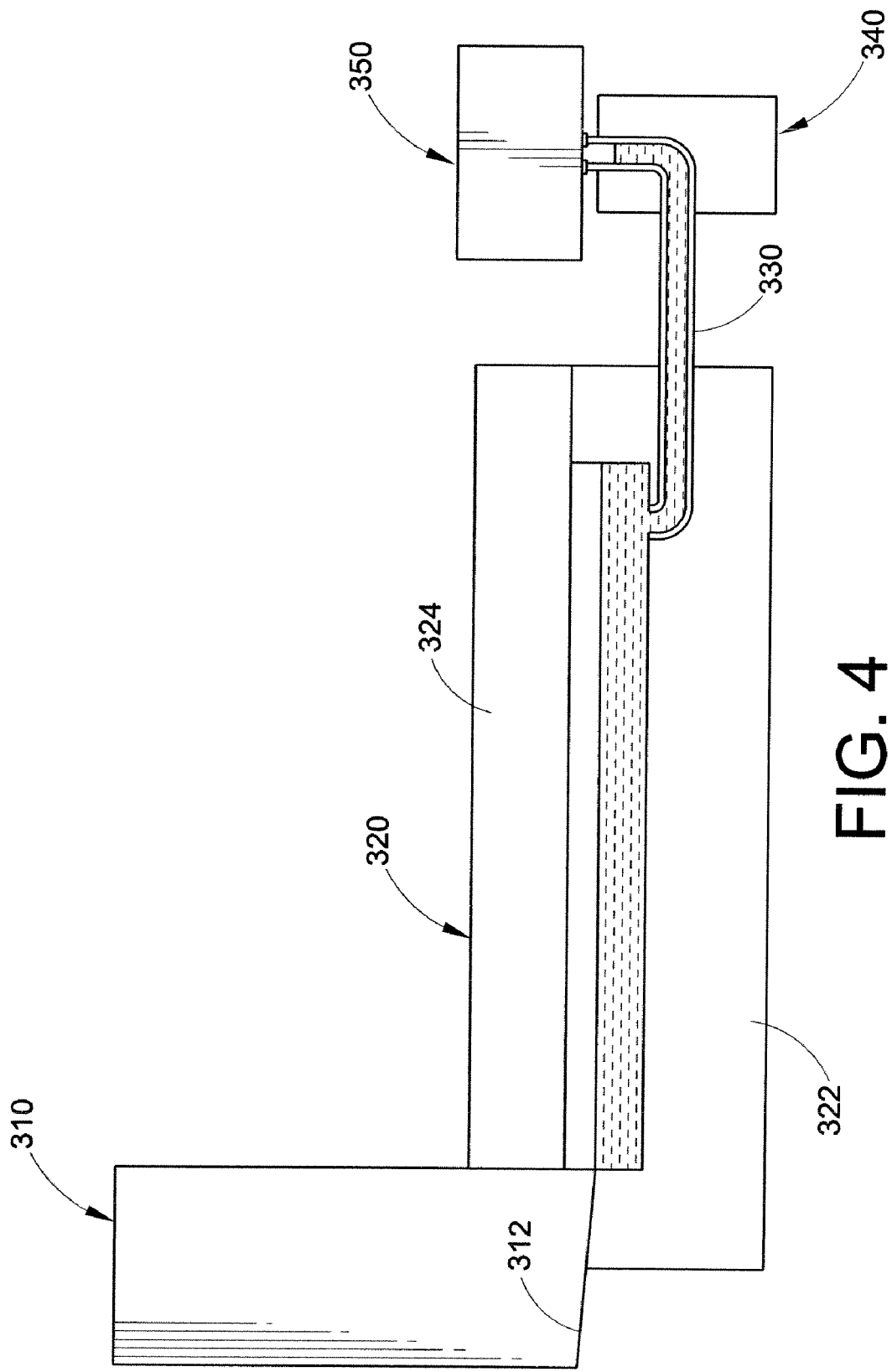
FIG. 4 is a schematic side elevational view in partial cross section of a quiescent transfer casting furnace system according to a fourth embodiment of the present disclosure.

A refinement of the action of the integrated melter/holder/caster illustrated in FIG. 4 is the operation of the holding furnace 320 at a minimum temperature, just sufficient to keep the metal molten, but possibly providing just sufficient superheat to allow the melt to avoid freezing in the case of loss of electrical power, or loss of heat, if the lid 324 of the furnace needs to be lifted off for cleaning on occasions.

The operation of the holding furnace 320 at a temperature close to a minimum temperature has significant advantages. These include the following:

i. Appropriate teaming up with the dry hearth melter which can only deliver metal at just above its melting point.

ii. The low temperature corresponds to low hydrogen solubility encouraging a maximum degassing effect during the passage of the metal through the furnace.

iii. Minimum wear or chemical attack of refractories, particularly minimizing the formation of corundum, which if allowed to form, can destroy the furnace.

iv. This design maximizes the life of electrical heating elements.

v. This design requires only a minimal amount of energy. Only heat losses from the furnace need to be provided for. For an effectively insulated furnace, such losses will only be on the order of 10 kilowatts for a unit that can deliver over 1000 kilograms of metal per hour.

Another benefit of the design illustrated in FIG. 4 is that the casting temperature is able to be changed between castings. In contrast, in normal casting, sometimes tons of metal have to be heated or cooled to change a casting temperature. Thus, an advantage is provided by a fully flexible casting unit that extracts a minimal and potentially zero, time penalty for a change from one run of castings to another.

The large area of the melt in this element acts beneficially as before. In contrast to the embodiment of FIG. 1, however, no pump and pump well furnace is required, further reducing the inventory of liquid metal in the whole system. Rather, a counter gravity unit, station or system 340 is employed. One such unit will be discussed hereinafter.

With reference now to FIG. 5, there is disclosed an enlarged view of a two part extension tube or transfer conduit 430, including a first part 432 and a second part 434. These are joined at mating flanges 435 and 436 which are separated by a refractory fiber gasket material 438. The advantage of the refractory fiber gasket material sandwiched between the two conduit parts 432 and 434 of the transfer conduit 430 is that such a gasket provides compliance between the holder and caster assemblies, such as holder 320 and casting station 340 illustrated in FIG. 4. It should be appreciated that the holder and casting station will be subject to different mechanical forces and different contractions and expansions, due to temperature changes. The joint can conveniently carry one or more thermocouples (not illustrated) allowing the temperature of the melt at this location to be sampled. Also, this design allows for easy maintenance since the casting unit can be removed without disturbance to the seal of that part of the tube fixed and sealed into the side of a holding furnace 420.

It should be appreciated that the transfer conduit 430 can be comprised of more than two parts merely as a matter of convenience for construction or maintenance. The greater number of joints would provide greater mechanical independence of movement of the various parts of the structure. On the other hand, each additional joint will require further support for the various sections of the tube or conduit. An upturned proximal end 440 is illustrated for the first tube section 432 in FIG. 5. The provision of such an upturned end of the tube in the holder allows for the use of a vertically acting stopper 442 which selectively permits communication between a holding furnace 420 and the conduit 430.

Figure 6:
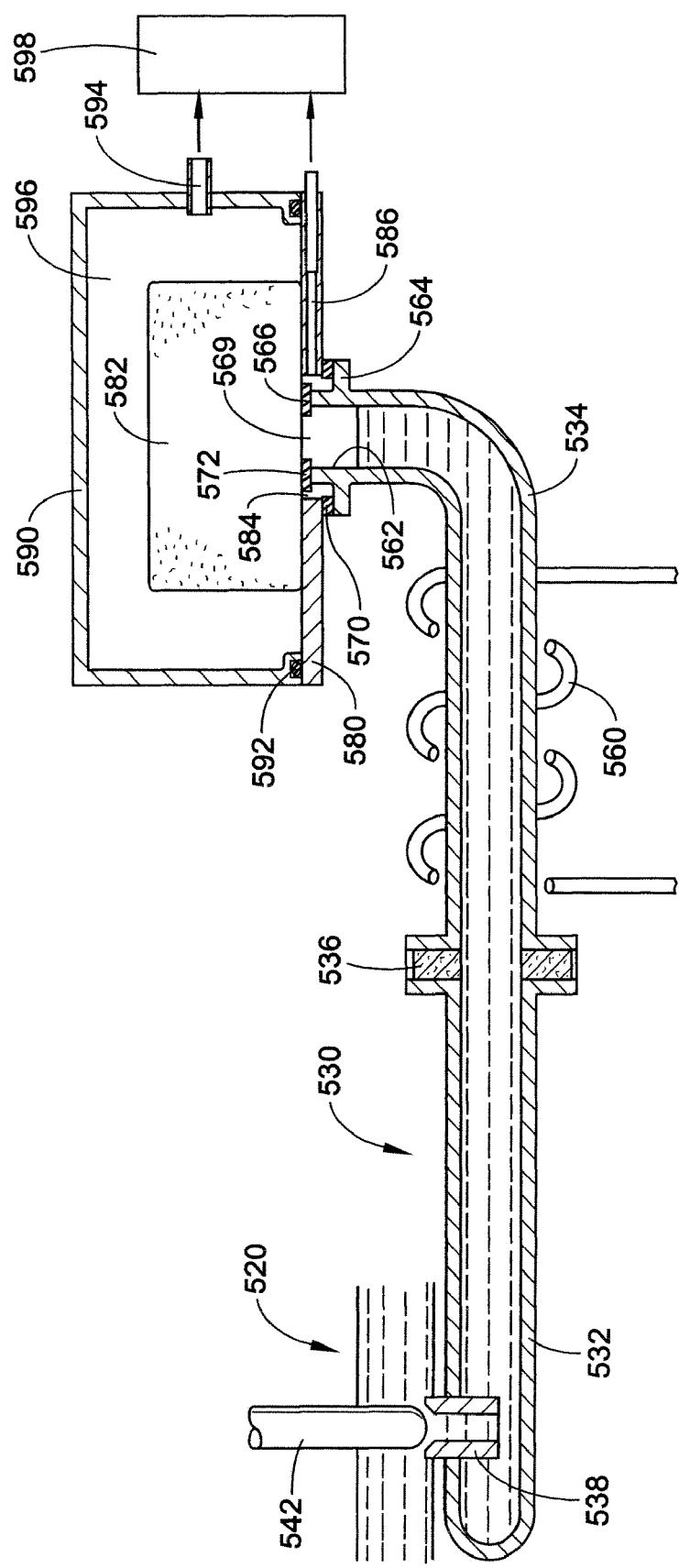
FIG. 6 is a schematic side elevational view in cross section of a portion of a quiescent transfer casting furnace system according to a sixth embodiment of the present disclosure; and, FIG. 7 is a schematic side elevational view in cross section of a portion of a quiescent transfer casting furnace system according to a seventh embodiment of the present disclosure.

Naturally, the melt is required to be brought up to a casting temperature prior to casting. This can be done by the provision of induction heating coils around the transfer conduit 430. Such heating coils are illustrated in FIGS. 5-7. The induction heating also additionally provides stirring to homogenize the temperature of the melt and extend the heating effect over a greater length of the tube to benefit those portions distant from the heater.

The extension tube or transfer conduit 430 is required to be of sufficient diameter to ensure that the inductive stirring action by heating together with natural convection will carry heat along the length of the tube to avoid any freezing in an early portion of the tube that traverses the insulating refractory layers of the holding furnace. A conventional thermocouple (not illustrated) in the heated portion of the tube can control energy input to control the casting temperature.

In the embodiment of FIG. 5, a pressure difference is provided by a pump in the form of a linear motor 450. Of course, a pair of such pumps working in series could be beneficial. Such an electromagnetic system has the benefit of easy control via a known computer (not illustrated). Two such linear motors placed in series would facilitate maximum control by allowing the pumps to be set in opposition so that they would work producing no net head but would keep the melt hot by their inductive action. The controlled change of power difference would allow controlled velocity filling. Maximum pumping effect would be achieved by both pumps working cooperatively at maximum power.

Also disclosed in FIG. 5 is the provision of induction heating coils 460 to allow the melt to be brought up to a casting temperature prior to casting. The induction heating and/or the linear motors will both additionally provide stirring to homogenize the temperature of the melt and to extend the heating effect over a great length of the conduit 430 to benefit those portions distant from the heater.

With reference now to FIG. 6, a further design of a conduit 530 is there illustrated. This conduit is connected via a casting station (not shown in this view for clarity) to a mold. The suction or vacuum is drawn on the mold in order to pull the melt into the mold. In this embodiment, a two part conduit 532, 534 is provided with the two parts being separated by a refractory fiber gasket material 536 or the like. The first conduit part 532 includes a small side tube 538 cemented into the first part. The side tube is connected to a holding furnace 520. The side tube guides the flow of the melt from the holding furnace 520 into the conduit 530, controlling its fall into the conduit during the initial stages of the filling of the holding furnace for the first time. A stopper 542 serves as a safety device if any accident occurs to the casting unit. More particularly, the supply of metal can be quickly and easily cut off. It should be appreciated that the stopper 542, as with the stopper 442, only moves a small amount so as not to disturb the melt as it flows from the holding furnace into the transfer conduit.

Looped around the second conduit portion 534 is a heating coil 560. In this embodiment, a distal end 562 of the conduit 530 extends into the casting unit and can be positioned adjacent a mold so as to communicate therewith. The distal end includes a peripheral side flange 564 and a conduit end face 566. Compressive seals 570, 572 are positioned at these locations as is evident from FIG. 6. The compressive seal 570 seals against a bottom face of a base plate 580 which supports a porous mold 582 on its top face. Located in the base plate 580 is an aperture 584 which allows the end face 566 of the transfer conduit distal end 562 to approach the mold 582. A suction line 586 is provided in the base plate and terminates at the aperture 584 in the base plate. In this way, a suction can be drawn in the area defined between the compressive seals 570 and 572 and around the exterior periphery of the distal end 562 of the transfer conduit.

Supported by the base plate 580 is a cover 590. A suitable sealing element, such as an O-ring seal 592 can be provided along the bottom edge of the cover 590 so as to seal between the cover and the base plate. A suction opening 594 is also provided in the cover 590 so as to allow a suction to be drawn in a space or chamber 596 defined within the cover and above the base plate.

The mold 582 can comprise a bonded aggregate material which is permeable so as to allow the suction of air through the mold (i.e., a vacuum drawn on the mold) and so directly to the melt surface. A program to control the level of vacuum can be employed to regulate the rate of rise of the molten metal or melt into the mold 582 via the transfer conduit 530. The vacuum would be applied to the mold from a suction source 598 which evacuates the atmosphere in chamber 596.

In conventional designs, the use of the vacuum for filling a mold would introduce the risk of unwanted air bubbles being drawn into the filling system, particularly at the joint between the orifice and the mold. Bubbles drawn into the casting through a seal at this point are likely to create major defects in the casting. In the present disclosure, this problem is addressed by surrounding the inner seal and the joint with a vacuum collar formed by compressive seals 570 and 572 and the suction line 586.

By taking care to apply a suction or vacuum directly to the volume around the joint, the pressure around the joint would be slightly lower than in the mold cavity because of the slight impermeability of the mold 582. In this way, any leakage of air around the lower seal 570 will be outwards rather than inwards. Thus, bubbles into the melt are no longer possible. However, outward leakage of the metal melt is unlikely as a result of its much greater viscosity as well as its tendency to freeze in a narrow channel. The seal 570 might leak some air, but this will be relatively unimportant if the pumping rate of the suction source or mechanism 598 is high. Alternatively, the compressive seals 570, 572, which may be made simply from compressed ceramic fiber, might be supplemented by metal foil around the seal 570 or even a metallic bellows in order to reduce leakage.

The level of the delivery orifice, i.e., the outlet opening 569 in the transfer conduit 530 is so positioned as to be only a few centimeters above the natural level of metal in the holding furnace 520. This is a significant natural advantage of the proposed design. The reason for this is that after each mold has been filled, the liquid in the mold has to be held in place so that it does not pour out of the mold when the mold is lifted from the casting station. The melt can be sealed into the mold and held in place by numerous well known devices, such as the action of the freezing of a specially designed narrow mold ingate, or the application of cooling at this point, such as via a chill, or the action of a slide gate, etc. Such options are well known in the art and have been omitted from the figures for simplicity.

Upon the sealing of the metal in the mold, the vacuum can be switched off. At this point, the melt in the transfer conduit 530 will fall naturally to its original level. The return to the original level occurs passively. Such action contrasts significantly with pumped systems and low pressure casting units in which the level of the melt near the orifice of the casting unit has to be actively controlled. Any failure of the active control can allow the melt to fall a long way down the heated launder tubes to the melt level generating areas of oxide on the internal surfaces of the refractory tubes during its fall. Alternatively, if the pressure in the pump systems remains too high, the melt will overflow the orifice, probably causing damage to the plant and equipment in it and possibly risking harm to personnel.

With reference now to FIG. 7, another type of delivery conduit 630 is there illustrated. In this design, a conduit second portion 634 has a distal end 636 that is turned at a right angle. This design permits a roll over type casting system such that a mold 650 in communication with the casting system is filled via its side. After filling, the mold can be rolled over, rotating 180° about an axis 652 through the center of the orifice. This casting unit or system has the well known advantages of conferring a favorable temperature gradient for sufficient feeding of the casting and allowing the mold to be detached quickly from the casting unit or system without the necessity for sealing in the liquid by a sliding gate or other device.

For all of the designs illustrated in FIGS. 4-7, it is well known to take the precaution of insulating the transfer tubes or conduits 330, 430, 530 and 630 in order to avoid undue loss of temperature for the transfer of the liquid metal or melt into the mold. For clarity, such conventional or well known features are not shown in the Figures. Alternatively, known heating devices other than the heating coils 460 and 560 can be employed.

The technique proposed herein is designed to achieve filling, transfers out or dosing to a casting unit or mold, degassing, and effective filtration. All this occurs without moving parts, except for one or more stoppers 442, 542 that move only relatively slowly through a relatively few millimeters vertically through the local melt surface, so as to disturb the surface only insignificantly.

Other geometries of the holding furnace can be envisioned in which two or three or more counter-gravity casting stations are set around a holding furnace of considerable area, emerging as a row at one end, or from all available sides etc.

According to the disclosure, the manufacturing technique and system combines a number of components in a novel manner to achieve the quiescent transfer of melts, leading to unique advantages in the properties of the cast product. The metal resulting directly from the dry hearth system (without the intermediate reheating bath) is not only free from large primary oxides (the oxide skins that formed the surfaces of the charge materials) and it is not only transferred without pouring and, thus, without entrainment, but is also at an extremely low temperature, only just above the freezing point of the melt. Maintaining the melt at such a low temperature in a holding or settling furnace confers many benefits. These include low energy consumption, long life to furnace refractories and heating elements and reduced energy to drive convection circulation. Moreover, a low gas content of the melt is achieved in this fashion.

In summary, there are many disturbances that affect the operation of a conventional holding furnace. These arise from such events as (i) the filling of the furnace (usually by pouring from a considerable height), (ii) emptying from the furnace (again, often by pouring from a significant height) into the mold or device that transfers to the mold, or (iii) from such treatments as rotary degassing, (iv) from the mechanical stirring-in of alloy additions, or (v) from significant changes in level of the melt that would create washing effects up and down the walls of the holder so as to create oxides.

The instant disclosure, on the other hand, pertains to a method and apparatus which employs a holding furnace from which all disturbances are designed to be suppressed, encouraging the sedimentation of inclusions, and achieving the simultaneous degassing of the melt, thus achieving liquid metal of high quality. This high quality is maintained into the cast product only if the melting and holding system described above is linked to a suitably quiescent system for transferring melt out of the furnace directly into a mold or into a transfer system that delivers to a mold.

In summary, the usual manner of filling a melt holding furnace is simply by pouring in fresh liquid metal. Such trauma completely disturbs the whole melt, stirring sedimented inclusions back into suspension, and entraining new inclusions since all pouring actions involve much folding-in of the surface oxide. In contrast, the operation of the melt system proposed in the current application is with minimal stirring or upsetting of the molten material at any stage of the progress of the melt, during its melting, temperature adjustment, cleaning, degassing and casting.

It should be recognized that if more than one furnace is employed, it is important that all are linked so that the melt level in all furnaces is substantially the same. This condition naturally confers extremely gentle transfer of the melt between the furnaces. It contrasts with many prior examples in the industry where the melt is transferred down a ramp, or is actually poured freely through the air, causing considerable oxidation and damage to the quality of the melt by the entrainment of oxides.

A quiescent transfer casting line can include a melting furnace 1, 310 which transforms solid metal into a melt. The melt is then transferred to a holding furnace 2, 120, 220, 320, 420, 520. A first channel 5 can communicate the holding furnace with the melting furnace. Alternatively, as shown in FIG. 4, the melting furnace can feed directly into the holding furnace. In one embodiment, the holding furnace can be connected to a pump furnace 3. A second channel 6 or a conduit 330, 430, 530, 630 can communicate the holding furnace with a counter gravity casting unit 4, 340 or another melt transfer device, such as the vacuum assist system shown in FIG. 4. The holding furnace 2, 120, 220, 320, 420, 520 has a relatively large surface area and a relatively shallow depth, having a width to depth ratio in the range of 4-100 to 1. A method employing such a casting line encourages the cleaning of the melt by the detrainment of non-metallic inclusions and avoids the re-entrainment of surface oxides into the body of the melt, in addition to achieving a degassing action and adjusting the temperature of the casting as required.

The present disclosure targets the whole melting and casting procedure to ensure that oxides are not only (i) reduced at the melting stage, but (ii) are eliminated, or at least greatly reduced (detrained and/or filtered) in a holding stage, and (iii) cast in such a way as to avoid re-entrainment during the final mold filling stage. Only a holistic approach tackling all these three issues simultaneously has a chance of solving the problem of the manufacture of castings with low oxide defect populations. This is the target of the present disclosure. The principle involved is that of quiescence. It is beneficial to provide the conditions of quiescence of both the surface of the melt, and the bulk liquid beneath the surface.

Once melted (and the melting process advantageously includes a dry hearth technique for the separation of the heavily oxidized skins of the charge materials), the surface of the melt is maintained at a substantially unvarying and horizontal level and is undisturbed, and the melt beneath the surface enjoys quiescent, non-convecting conditions. The imposition of these conditions requires the elimination of conventional degassing and cleaning of the melt by techniques involving the passage of bubbles of inert gas through the melt. Novel non-disturbing techniques are employed such as hydrogen diffusion out of the melt and its removal from the system by counter-current flow of a dry, hydrogen-free gas. Cleaning of the melt from inclusions is accomplished efficiently for the first time by sedimentation.

All this is seen to achieve various solutions to the difficulties of melting, and degassing liquid metal, and transferring into a mold without the introduction of deleterious oxide films.

The disclosure has been described with reference to several preferred embodiments. Obviously, modifications and alterations will occur to others upon the reading and understanding of the preceding specification. It is intended that the invention be construed as including all such alterations and modifications insofar as they come within the scope of the appended claims or the equivalents thereof.

What is claimed is:

1. A quiescent melt handling system comprising:
a melting furnace;
a holding furnace communicating with said melting furnace, said holding furnace containing a molten metal, wherein said holding furnace comprises a relatively large surface area and a relatively shallow depth having a width to depth ratio in the range of 4-100 to 1 such that the dimensions of said holding furnace are selected to retard a convection flow of the molten metal in said holding furnace;
a means for separating inclusions from the melt in said holding furnace;
a mold communicating with said holding furnace;
a means for replenishing a dry atmosphere in said holding furnace, wherein said holding furnace allows hydrogen in the melt to equilibrate with the dry atmosphere being replenished into said holding furnace wherein the means for replenishing comprises a gas inlet located adjacent an outlet of said holding furnace so that a counter current flow of the dry atmosphere takes place; and,
a vacuum assist system for said mold to draw the melt from said holding furnace into said mold.

2. The system of claim 1 further comprising:
a conduit communicating said holding furnace with said mold; and
a heating element disposed adjacent said conduit for transferring heat thereto.

3. The system of claim 1 wherein said melting furnace comprises a dry hearth furnace, including a sloping hearth.

4. The system of claim 3 wherein said holding furnace further comprises a dry heating means.

5. The system of claim 3 wherein said holding furnace has a length in the range of 1 to 200 meters and wherein a length to width ratio is in the range of 1-100 to 1.

6. The system of claim 1 wherein said means for separating inclusions comprises at least one of a filter and a flow obstructing device.

7. A quiescent melt handling system comprising:
a dry hearth melting furnace including a sloping hearth;
a holding furnace communicating with said melting furnace, said holding furnace containing a molten metal, wherein said holding furnace has a length, width and depth with the length being in the range of 1 to 200 meters and wherein a length to width ratio is in the range of 1-100 to 1 such that said holding surface comprises a relatively large surface area, said holding furnace depth being relatively shallow such that said holding furnace has a width to depth ratio in the range of 4-100 to 1 such that the dimensions of said holding furnace retard convection of the molten metal in the holding furnace;
a structure for separating inclusions from the melt in said holding furnace;
a mold communicating with said holding furnace;
a supply system for replenishing a dry atmosphere in said holding furnace, wherein said holding furnace allows hydrogen in the melt to equilibrate with the dry atmosphere being replenished into said holding furnace, wherein the supply system comprises a gas inlet located adjacent an outlet of said holding furnace so that a counter current flow of the dry atmosphere takes place; and,
a counter gravity mold filling device located in a path between said mold and said holding furnace to enable said mold to draw the melt from said holding furnace into said mold.

8. The system of claim 7 further comprising:
a conduit communicating said holding furnace with said mold; and
a heating element disposed adjacent said conduit for transferring heat thereto.

9. The system of claim 7 wherein said holding furnace further comprises a dry heating system.

10. The system of claim 7 wherein said structure for separating inclusions comprises at least one of a filter and a flow obstructing device.

11. A quiescent melt handling system comprising:
a melting furnace;
a holding furnace communicating with said melting furnace, said holding furnace containing a molten metal, wherein said holding furnace comprises a relatively large surface area and a relatively shallow depth having a width to depth ratio in the range of 4-100 to 1;
a structure for separating inclusions from the melt in said holding furnace;
a mold communicating with said holding furnace;
a vacuum assist system connected to said mold to draw the melt from said holding furnace into said mold; and
a gas inlet located adjacent an outlet of said holding furnace and a gas outlet located adjacent an inlet of said holding furnace for replenishing a dry atmosphere in said holding furnace so that a counter current flow of the dry atmosphere takes place, wherein said holding furnace allows hydrogen in the melt to equilibrate with the dry atmosphere being replenished into said holding furnace.

* * * * *